(12) United States Patent
Clark (10) Patent No.: US 7,555,112 B2
(45) Date of Patent: Jun. 30, 2009

(54) SERVICE(S) PROVIDED TO TELEPHONY DEVICE(S) THROUGH EMPLOYMENT OF DATA STREAM(S) ASSOCIATED WITH THE CALL

(75) Inventor: Edward Alan Clark, Sugar Grove, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1079 days.

(21) Appl. No.: 10/698,327

(22) Filed: Oct. 31, 2003

(65) Prior Publication Data

US 2005/0096925 A1 May 5, 2005

(51) Int. Cl.
*H04M 7/00* (2006.01)

(52) U.S. Cl. .................. 379/220.01; 709/227

(58) Field of Classification Search .......... 709/227; 379/220.01
See application file for complete search history.

(56) References Cited

U.S. PATENT DOCUMENTS

| | | | |
|---|---|---|---|
| 6,792,102 B2 * | 9/2004 | Shires ............... | 379/265.04 |
| 2001/0009014 A1 * | 7/2001 | Savage et al. .......... | 709/204 |
| 2005/0033684 A1 * | 2/2005 | Benedyk et al. ........ | 705/39 |
| 2006/0177034 A1 * | 8/2006 | Reding et al. ......... | 379/211.02 |

OTHER PUBLICATIONS

Public Switched Telephone Network, http://www.wikipedia.org/w/wiki.phtml?title=Public_switched_telephone_network&printabl, Aug. 29, 2003, pp. 1-2, St. Petersburg, USA.

Howe, Dennis, Public Switched Telephone Network, http://www.wombat.doc.ic.ac.uk/foldoc/foldoc.cgi?PSTN, Aug. 29, 2003, p. 1, United Kingdom.

Dual-tone multi-frequency, http://www.wikipedia.org/w/wiki.phtml?title=Dual-tone_multi-frequency&printable=yes, Aug. 29, 2003, pp. 1-2, St. Petersburg, USA.

CPE, http://www.techweb.com/encyclopedia/defineterm?term=CPE, Aug. 6, 2003, p. 1, Seattle, USA.

Section 1 Review, http://www.coste.com/CIE/Course/Section1/9.htm, pp. 1-2, Worcester, USA, Oct. 31, 2003.

Session Initiation Protocol, http://searchnetworking.techtarget.com/sDefinition/0,,sid7_gci541639,00.html, Aug. 22, 2003, pp. 1-2, Needham, USA.

S, http://www.cisco.com/univercd/cc/td/doc/cisintwk/ita/s12.htm, Aug. 28, 2003, p. 15, San Jose, USA.

Bearer Independent Call Control, http://searchnetworking.techtarget.com/sDefinition/0,,sid7_gci775898,00.html, Oct. 20, 2003, pp. 1-2, Needham, USA.

Internet Protocol, http://searchnetworking.techtarget.com/sDefinition/0,,sid7_gci214031,00.html, Aug. 22, 2003, pp. 1-2, Needham, USA.

Cisco Systems, Inc, Integrated Services Digital Network, Aug. 28, 2003, pp. 12-1 to 12-8, Cisco Press, Indianapolis, USA.

Integrated Services Digital Network, http://www.wikipedia.org/w/wiki.phtml?title=Integrated_services_digital_network&printable, Aug. 29, 2003, pp. 1-3, St. Petersburg, USA.

* cited by examiner

*Primary Examiner*—Quynh H Nguyen (57) ABSTRACT

An intermediate application server component provides one or more services to one or more telephony devices on a call through employment of one or more data streams associated with the call.

22 Claims, 5 Drawing Sheets

US 7,555,112 B2
SERVICE(S) PROVIDED TO TELEPHONY DEVICE(S) THROUGH EMPLOYMENT OF DATA STREAM(S) ASSOCIATED WITH THE CALL

CROSS-REFERENCE TO RELATED APPLICATIONS

This application contains subject matter which is related to the subject matter of the following application, which are assigned to the same assignee as this application. The below-listed applications are hereby incorporated herein by reference in their entireties:

"DATA STREAM ASSOCIATION WITH CALL THROUGH EMPLOYMENT OF IDENTIFIER WITHIN MESSAGES ASSOCIATED WITH THE CALL," by Clark, et al., co-filed herewith.

"SERVICE(S) PROVIDED TO TELEPHONY DEVICE THROUGH EMPLOYMENT OF DATA STREAM(S) ASSOCIATED WITH CALL," by Edward A. Clark, co-filed herewith.

"TRANSMISSION OF USER INPUT(S) TO TELEPHONY DEVICE(S) THROUGH EMPLOYMENT OF DATA STREAM(S) ASSOCIATED WITH CALL," by Edward A. Clark, co-filed herewith.

TECHNICAL FIELD

The invention relates generally to telecommunications and more particularly to providing services through employment of data streams associated with the call.

BACKGROUND

A user of Customer Premise Equipment ("CPE") initiates a call on a network. The CPE in one example comprises a telephony device. The CPE in one example employs a call request signaling, for example, a Dual Tone Multi Frequency ("DTMF") protocol, to initiate the call. The user of the CPE initiates the call to an application server component that provides one or more services for the call. The application server component is located within an intermediate network associated with the call.

For example, the application server component provides one or more services to the CPE. The services in one example comprise one or more conference call services. In order to interact with the services, the user of the CPE employs one or more touch-tones or one or more voice commands. The application server component receives the touch-tones and/or voice commands over a voice channel associated with the call. The touch-tones and/or voice commands in one example are heard by users of all other CPEs on the conference call.

The application server component receives one or more messages associated with the call from the network. The messages associated with the call comprise information regarding the calling and/or called CPEs. The application server component provides the services based upon the information present in the messages associated with the call, for example, the touch-tones and/or voice commands. The services provided by the application server component are limited to the information provided in the messages received from network elements, such as the application server component and/or a switch component, associated with the call. As one shortcoming, the restriction of the services provided by the application server component to the information provided in the messages undesirably limits the types of services provided to the users of the CPEs.

Thus, a need exists to provide one or more services that are not limited to the information present in the one or more messages received from the network.

SUMMARY

The invention in one embodiment encompasses an apparatus. An intermediate application server component provides one or more services to one or more telephony devices on a call through employment of one or more data streams associated with the call.

Another embodiment of the invention encompasses a method. One or more portions of an intermediate network provide one or more services to one or more telephony devices on a call through employment of one or more data streams associated with the call.

Yet another embodiment of the invention encompasses an article. The article comprises one or more computer-readable media. The article comprises means in the computer-readable medium for providing, by one or more portions of an intermediate network, one or more services to one or more telephony devices on a call through employment of one or more data streams associated with the call.

DESCRIPTION OF THE DRAWINGS

Features of exemplary implementations of the invention will become apparent from the description, the claims, and the accompanying drawings in which:

DETAILED DESCRIPTION

Figure 1:
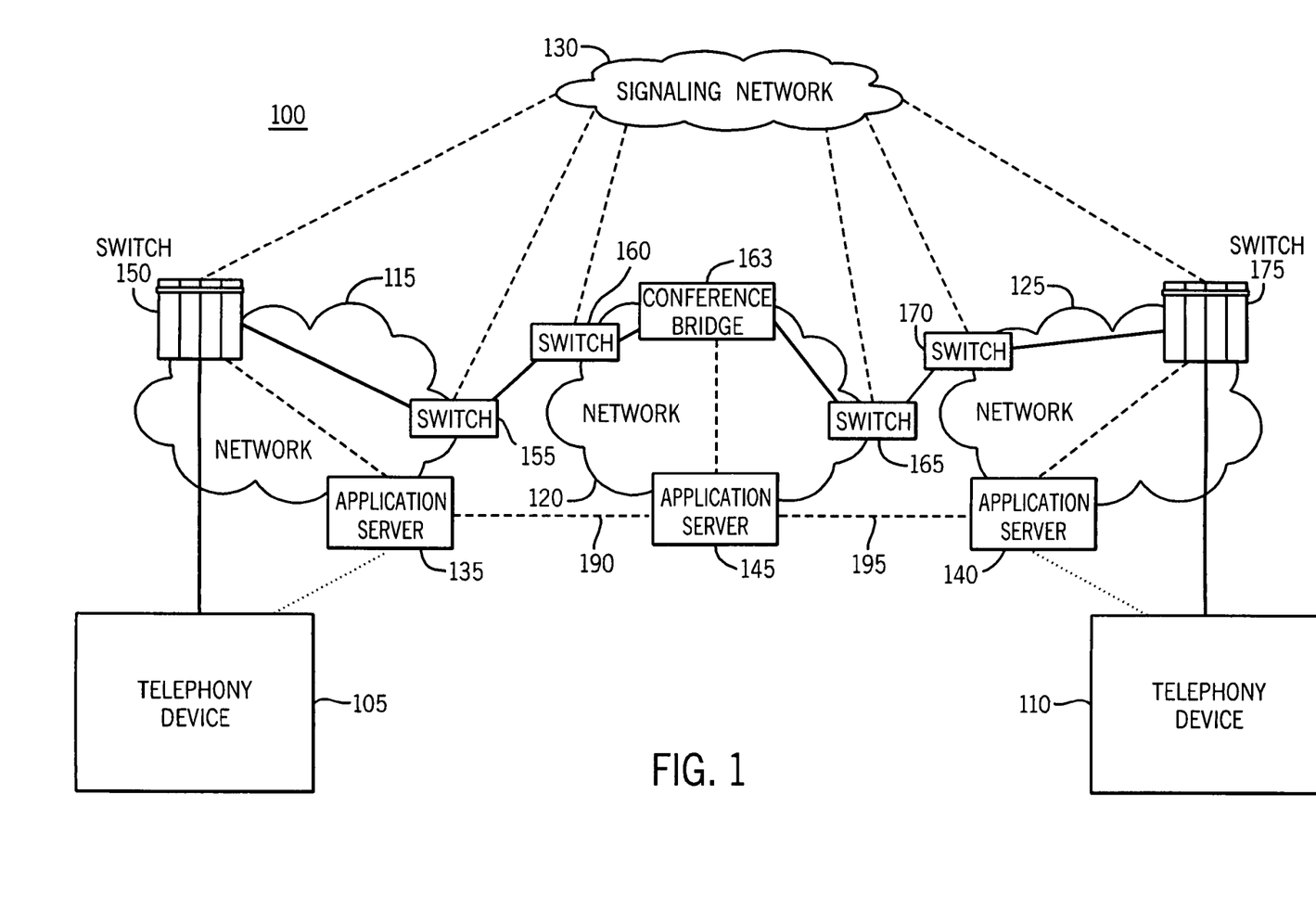
FIG. 1 is a representation of one exemplary implementation of an apparatus that comprises one or more application server components, one or more switch components, one or more telephony devices, one or more networks, and one or more intermediate networks.

Turning to FIG. 1, an apparatus 100 in one example comprises one or more telephony devices 105 and 110, and one or more networks 115, 120, 125, and 130. The telephony devices 105 and 110 in one example comprise one or more Customer Premise Equipments ("CPEs"), such as a computer, a web-enabled device, and/or a telephone. The telephony devices 105 and 110 initiate and/or receive one or more calls. In one example, the telephony device 105 initiates a call to the telephony device 110. In another example, the telephony device 105 receives a call initiated by the telephony device 110.

The telephony devices 105 and 110 initiate calls through employment of call request signaling. The call request signaling in one example comprises a Dual-Tone Multi-Frequency ("DTMF" or Touch Tone) signaling, as will be understood by those skilled in the art. The telephony device 105 and 110 initiate calls on the networks 115, 120, 125, and/or 130.

The networks 115, 120, and 125 in one example comprise one or more service provider networks. In one example, the networks 115, 120, and 125 comprise a Public Switched Telephony Network ("PSTN") and/or an Integrated Services Digital Network ("ISDN"). The network 130 in one example comprises a signaling network, for example, a Signaling System 7 ("SS7") network. The networks 115, 120, 125, and 130 in one example comprise one or more application server components 135, 140, and 145 and one or more switch components 150, 155, 160, 165, 170, and 175.

The network 120 in one example comprises an intermediate network. The network 120 provides one or more services associated with a call. The network 120 in one example comprises one or more service components, for example, a conference bridge component 163, one or more intermediate application server components, such as the application server component 145, and one or more intermediate switch components, such as the switch components 160 and/or 165. The application server component 145 and the service component 163 cooperate to provide the one or more services associated with the call.

One or more of the networks 115, 120, 125, and 130 communicate with one or more other of the networks 115, 120, 125, and/or 130 through employment of one or more call control protocols. The one or more call control protocols in one example comprises an Integrated Services Digital Network User Part ("ISUP") protocol, the Session Initiation Protocol ("SIP"), the Bearer Independent Call Control ("BICC") protocol, and the Transaction Capabilities Application Part ("TCAP") protocol. The networks 115, 120, 125, and/or 130 establish the calls from the telephony device 105 to the telephony device 110.

The application server components 135, 140, and/or 145 comprise one or more application servers. The application server component 135 and/or 140 in one example comprise user-related application server components. The application server components 135 and/or 140 in one example comprise Customer Premise Equipment ("CPE"). One or more of the application server components 135, 140, and/or 145 communicate with one or more other of the application server components 135, 140, and/or 145 through employment of one or more data stream control protocols. The data stream control protocols in one example comprise one or more of the User Datagram Protocol ("UDP"), the Transfer Control Protocol ("TCP"), and/or the Session Initiation Protocol ("SIP").

One or more of the application server components 135, 140, and/or 145 communicate with one or more of the one or more switch components 150, 155, 160, 165, 170, and/or 175 through employment of one or more service control protocols. The service control protocol in one example comprises the Session Initiation Protocol ("SIP"). The application server components 135, 140, and 145 in one example communicate with the switch components 150, 175, and 160, respectively.

The switch components 150, 155, 160, 165, 170, and 175 in one example comprise one or more telephony switches, for example, one or more Service Switching Points ("SSPs").

The switch components 150, 155, 160, 165, 170, and/or 175 communicate with the telephony devices 105 and/or 110 through employment of the call request signaling. The switch components 150, 155, 160, 165, 170, and/or 175 communicate with one or more of the switch components 150, 155, 160, 165, 170, and/or 175 through employment of one or more of the one or more call control protocols.

In one example, the switch components 150, 155, 160, 165, 170, and/or 175 employ one or more messages 502 (FIG. 5), for example, one or more initiation messages, to establish the call. In another example, the switch components 150, 155, 160, 165, 170, and/or 175 employ one or more messages 602 (FIG. 6), for example, one or more request-back messages during establishment of a call. The messages 502 and the messages 602 in one example conform to the call control protocol.

The application server components 135, 140, and/or 145 establish one or more data streams, for example, data streams 190 and/or 195 with one or more of the application server components 135, 140, and/or 145. The application server components 135, 140, and/or 145 associate the data streams 190 and/or 195 with calls. The application server components 135, 140, and/or 145 employ one or more of the data streams 190 and/or 195 to provide one or more services for calls.

Figure 6:
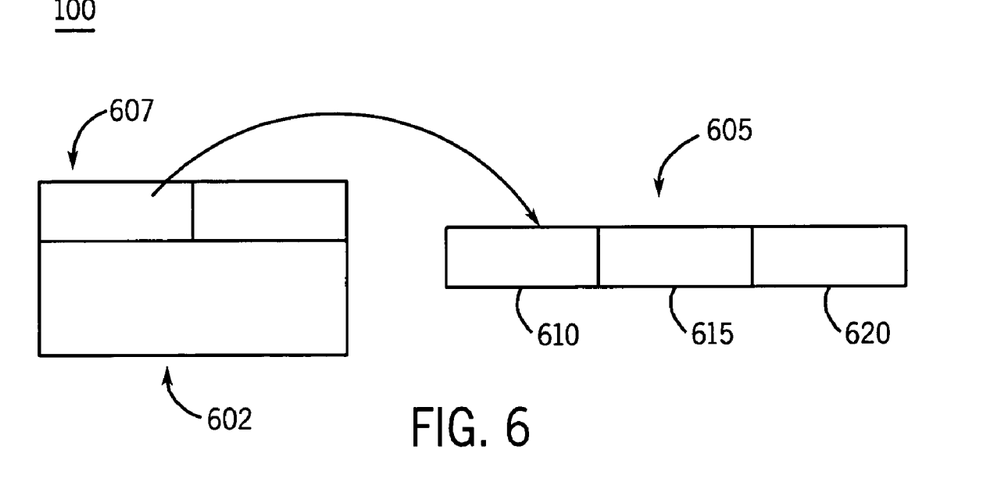
FIG. 6 is a representation of another exemplary message employed in establishment of the data stream by the application server component and the switch component of the apparatus of FIG. 1.
Figure 7:
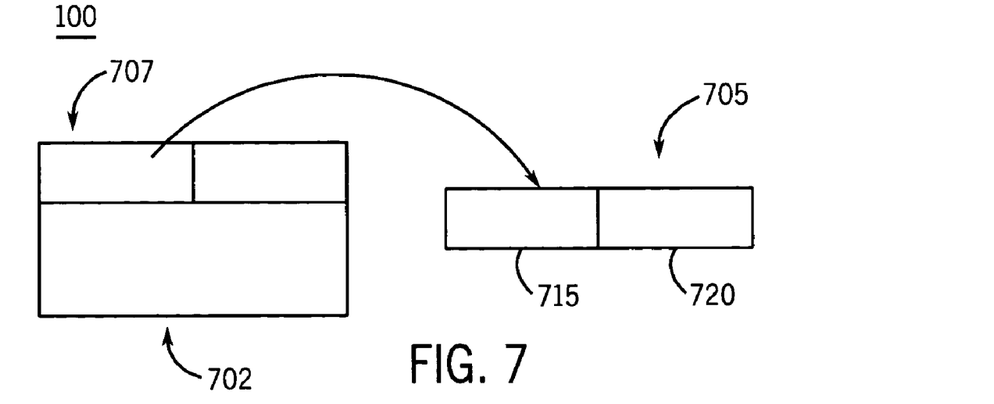
FIG. 7 is a representation of yet another exemplary message employed in establishment of the data stream by the application server component and the switch component of the apparatus of FIG. 1.

The application server components 135, 140, and/or 145 establish the data streams 190 and/or 195 through employment of one or more identifiers 505 (FIG. 5), 605 (FIG. 6) and/or 705 (FIG. 7). The application server components 135, 140, and/or 145 employ the identifiers 505, 605, and/or 705 to associate the data stream with calls.

Figure 5:
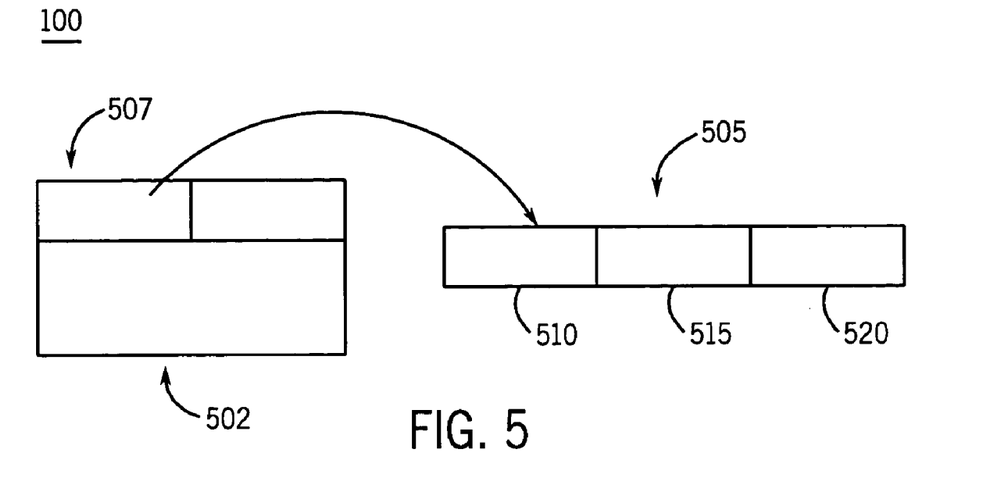
FIG. 5 is a representation of an exemplary message employed in establishment of the data stream by the application server component and the switch component of the apparatus of FIG. 1.

An identifier 505 in one example comprises a network address 510, a port 515, and an identification tag 520. The network address 510 in one example comprises an Internet Protocol ("IP") address associated with one of the application server components 135, 140, and/or 145. The port 515 comprises a port number, for example, port 8080, associated with one of the application server components 135, 140, and/or 145. The port 515 in one example is associated with the one or more services provided by the application server components 135, 140, and/or 145 for a call. The identification tag 520 serves to uniquely identify the call, as will be appreciated by those skilled in the art.

The application server components 135, 140, and/or 145 establish the data streams 190 and/or 195 through employment of one or more messages 702 (FIG. 7), for example, one or more data stream request messages. Wherein a message 702 comprises a data stream request message, the application server components 135, 140, and/or 145 provide a portion of the identifier 505 within the message 702. The message 702 conforms to one or more of the data stream control protocols.

Referring to FIGS. 5-7, the message 502 and 602 conform to the call control protocol. The message 702 conforms to the data stream request protocol. The messages 502, 602, and 702 comprise one or more generic parameters 507 and 607. The generic parameters 507 and 607 in one example comprise one or more Generic Address Parameters ("GAPs").

The message 502 in one example comprises the initiation message. The message 502 comprises the generic parameter 507. The generic parameter 507 in one example comprises the identifier 505. The switch component 150 and the application server component 135 in one example provide the identifier 505 within the generic parameter 507.

The message 602 in one example comprises a request-back message. The message 602 comprises the generic parameter 607. The generic parameter 607 in one example comprises the identifier 605. The identifier 605 in one example comprises a network address 610, a port 615, and an identification tag 620.

The message 702 in one example comprises a data stream request message. The message 702 comprises a portion of an identifier, for example, the identifier 505, within the generic parameter 707 of the message 702. The generic parameter 707 comprises a port 715 and an identification tag 720. In one example, the port 715 comprises the port 515 or 615. In another example, the identification tag 720 comprises the identification tag 520 or 620. The application server component 135 in one example routes the message 702 to a network address 710.

In one example, the network address 710, the port 715, and the identification tag 720 comprise the network address 510, the port 515, and the identification tag 520. In another example, the network address 710, the port 715, and the identification tag 720 comprise the network address 610, the port 615, and the identification tag 620.

The application server components 135, 140, and/or 145 associate a call with the identifiers 505 of a plurality of identifiers 505 and/or identifier 605 of a plurality of identifier 605. The application server components 135, 140, and/or 145 in one example select the identifier 505 and/or 605 from the plurality of identifiers 505 and/or 605 such that the identifier 505 and/or 605 uniquely identifies the call.

For example, the application server component 135 selects a first identifier 505 to associate with a first call, and a second identifier 505 to associate with a second call. The application server component 135 distinguishes the first call from the second call through employment of the first identifier 505 and the second identifier 505, as will be appreciated by those skilled in the art.

In one example, the application server component 135 selects the identifier 505 and/or 605 from the plurality of identifiers 505 and/or 605 available for a call through employment of a random selection method. In another example, the application server component 135 employs a static selection method to select the identifier 505 and/or 605.

In yet another example, the application server component 135 employs a priority selection method to select the identifier 505 and/or 605. In still yet another example, the application server component 135 selects the identifier 505 and/or 605 based on information associated with a call provided by the switch component 150.

For example, where the application server component 135 selects the identifier 505, the application server component 135 selects: the network address 510 of a plurality of network addresses 510 associated with the application server component 135; the port 515 of a plurality of ports 515 associated with the application server component 135; and the identification tag 520 of a plurality of identification tags 520 associated with the application server component 135.

In another example, the application server component 140 associates the identifier 505 with a call through employment of the message 502, for example, the initiation message. For example, the message 502 associated with the call comprises the identifier 505. Upon receipt of the message 502, the switch component 175 communicates with the application server component 140 to provide the identifier 505 to the application server component 140. The application server component 140 stores the identifier 505.

The application server components 135, 140, and/or 145 in one example associate the data streams 190 and/or 195 with calls through employment of the identifiers 505 and/or 605. The application server components 135, 140, and/or 145 in one example employ the identifier 505 to distinguish the data stream 180 associated with the first call from the data stream 185 associated with the second call.

For example, the application server component 135 associates the first call with the first identifier 505. The application server components 135 and 145 cooperate to establish the data stream 190 associated with the first call. The application server component 140 associates the second call with the second identifier 505. The application server components 140 and 145 cooperate to establish the data stream 195 associated with the second call. The application server component 145 employs the first identifier 505 and the second identifier 505 to distinguish the data stream 190 associated with the first call from the data stream 195 associated with the second call.

In one example, the application server components 135, 140, and/or 145 provide the one or more services through employment of the data streams 190 and/or 195. In another example, the application server components 135 and 145 in one example cooperate through employment of the data stream 190 to update the one or more services provided to the telephony device 110. In another example, the application server components 135, 140, and/or 145 transfer data related to the one or more services through employment of the data streams 190 and/or 195. The application server components 135, 140, and/or 145 employ the data to provide the one or more services to the telephony devices 105 and 110.

The application server components 135, 140, and/or 145 in one example employ the data to form one or more interfaces associated with the one or more services. For example, the application server component 145 transfers data to form a first interface to the application server component 135. The application server component 145 transfers data to form a second interface to the application server component 140. In example, the intermediate application server component, for example, the application server component 145, transfers data to form a control interface associated with the one or more services.

The interfaces in one example comprise one or more eXtended Markup Language ("XML") interfaces. The application server components 135, 140, and/or 145 in one example provide the interfaces to the telephony device 105 and/or 110. The application server components 135, 140, and/or 145 employ one or more internet protocols such as HyperText Transfer Protocol ("HTTP") to provide the interfaces to the telephony devices 105 and/or 110.

The application server components 135, 140, and/or 145 in one example provide the one or more services on a call-by-call basis through employment of the identifier 505. The application server components 135, 140, and/or 145 employ the identifier 505 to distinguish a first one or more services associated with the first call from a second one or more services associated with the second call. For example, the application server component 135 employs the first identifier 505 to provide the first one or more services through employment of the data stream 180. The application server component 135 employs the second identifier 505 to provide the second one or more services through employment of the data stream 185.

One or more of the switch components 150, 155, 160, 165, 170, and/or 175 cooperate to establish calls. The switch components 150, 155, 160, 165, 170, and/or 175 provide the identifier within the messages 502 and/or 602 associated with the calls. The switch components 150, 155, 160, 165, 170, and/or 175 associate the calls with the identifier 505 and/or 605. The switch components 150, 155, 160, 165, 170, and/or 175 cooperate with the application server components 135, 140, and/or 145 to provide the one or more services for the respective calls.

The switch components 150, 155, 160, 165, 170, and/or 175 establish a call through employment of the message 502, for example, the initiation message, and/or the message 602, for example, the request-back message. The Integrated Services Digital Network User Part protocol comprises the message 502, for example, an Initial Address Message ("IAM"), and the message 602, for example, a Call ProGress ("CPG") message.

The switch components 150, 155, 160, 165, 170, and/or 175 provide the identifier 505 within the message 502 and/or the identifier 605 within the message 602 associated with a call. In one example, the switch component 150 inserts the identifier 505 into the generic parameter 507 of the message 502. In another example, switch component 175 inserts the identifier 605 into the generic parameter 607 of the message 602.

For example, the switch component 150 is pre-provisioned to communicate with the application server component 135 upon receipt of the message 502, and/or message 602, where the message 502 comprises the initiation message, and/or the message 602 comprises the request-back message. The switch component 150 provides the identifier 505 from within the message 502 and/or the message 602 to the application server component 135. In another example, the switch component 175 is pre-provisioned to communicate with the application server component 140 to obtain the identifier 505 upon sending of the message 502 and/or the message 602 from the switch component 175.

The message 502, for example, the initiation message, is received by the switch component 175. Where the message 502 omits the identifier 505, the switch component 175 communicates with the application server component 140 to obtain the identifier 605. The switch component 175 inserts the identifier 605 into the message 602, for example, the request-back message. The switch component 175 sends the message 602 to the switch component 150.

The switch components 150, 155, 160, 165, 170, and/or 175 associate the identifier 505 with a call. The switch components 150, 155, 160, 165, 170, and/or 175 associate the identifier 505 with the call through employment of the message 502. For example, the switch component 150 associates the identifier 505 with the call established by the message 502 through employment of the message 502.

Where a user of the telephony device 110 establishes a call, the switch components 150, 155, 160, 165, 170, and/or 175 cooperate with the application server components 135, 140, and/or 145 to provide the one or more services for the call. In one example, the application server components 135 and 145 cooperate to provide the one or more services associated with the call to the telephony device 105. In another example, the application server components 140 and 145 cooperate to provide the one or more services associated with the call to the telephony device 110. Where a user of the telephony device 110 interacts with the call, for example, through a touch-tone selection, the application server component 145 and the switch component 175 cooperate to update the one or more services associated with the call through employment of the identifier 505 and/or 605.

For example, the switch component 160 plays a voice prompt to the telephony device 105. The application server components 135 and 145 cooperate to transfer data related to billing information about the telephony device 105. Where the telephony device 105 terminates the call, the application server components 135 and 145 cooperate to record the billing information for the telephony device 105. In one example, the switch components 150 and 160 and the application server components 135 and 145 cooperate to update the voice prompt based on the billing information. In another example, the switch components 150 and 160 and the application server components 135 and 145 cooperate to update the billing information based upon a response from a user to the voice prompt.

In another example, the user of the telephony device 110 performs one or more interactions with the one or more interfaces provided by the application server component 145. The application server component 140 employs the identifier 505 associated with the call to communicate an interaction to the application server component 145. The application server component 145 employs the identifier 505 to update the call. For example, the application server component 145 communicates with the switch component 160 to mute the user of the telephony device 110 on the call.

Figure 2:
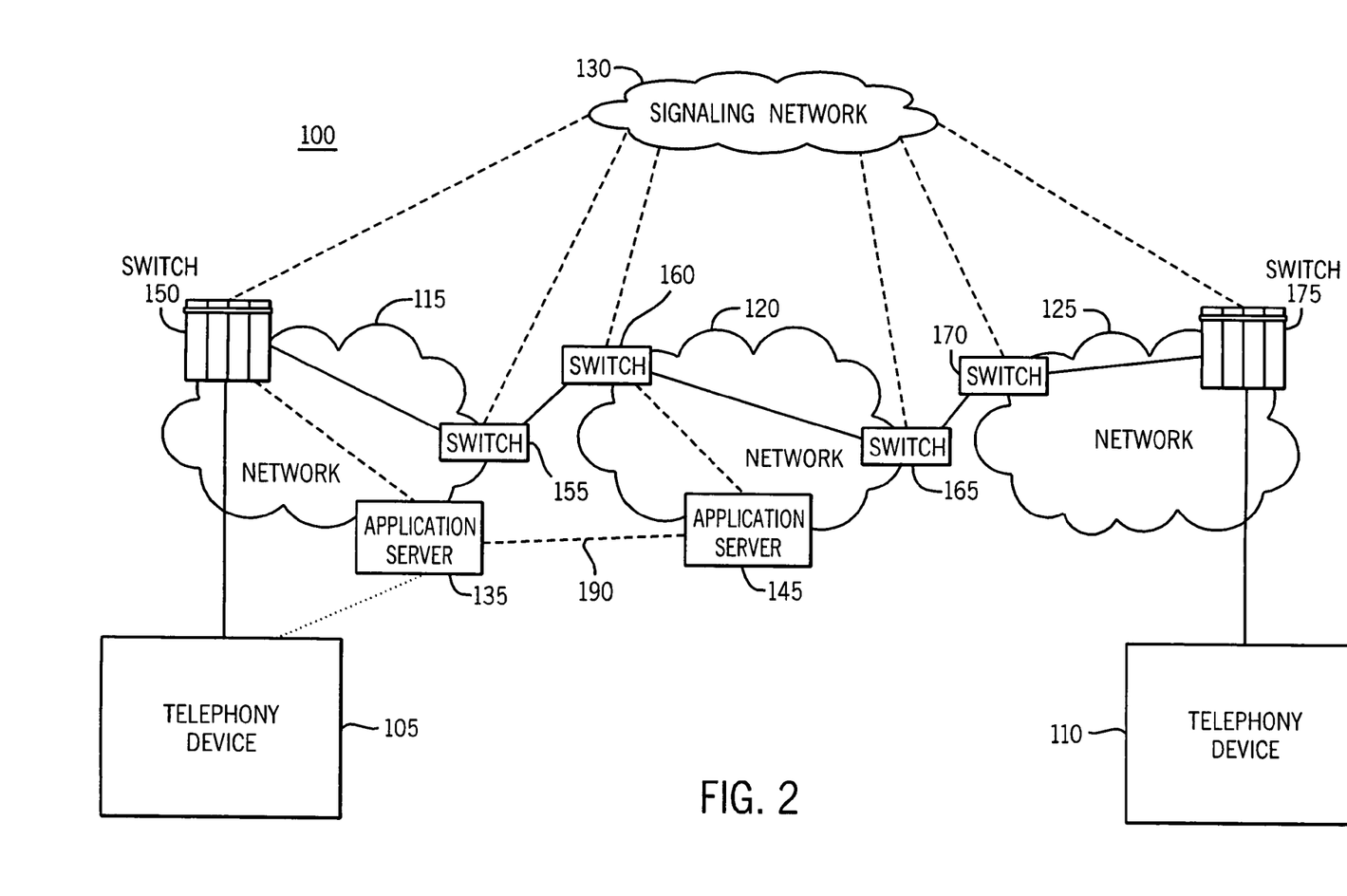
FIG. 2 is a representation of a second exemplary implementation of the apparatus of FIG. 1.

Turning to FIG. 2, the apparatus 100 in one example comprises the telephony devices 105 and 110, and the networks 115, 120, 125, and 130. The network 120 in one example comprises the intermediate network that provides the one or more services to one or more calls. The network 120 comprises the service component, for example, a pre-paid service component. In one example, the pre-paid service component comprises the switch component 160. In another example, the pre-paid service component comprises the switch component 169 and the application server component 145. The switch component 160 and the telephony device 105 in one example cooperate to establish a pre-paid call. The switch component 160 and the application server component 145 cooperate to provide the one or more services associated with the pre-paid call. The switch component 160 and the application server component 145 cooperate to provide one or more pre-paid services associated with the pre-paid call.

The application server components 135 and 145 cooperate to provide the one or services, for example, one or more pre-paid services. The application server components 135 and 145 employ the one or more data streams associated with the call to provide the one or more interfaces associated with the call the user of the telephony device 105.

An illustrative description of exemplary operation of the apparatus 100 is presented, for explanatory purposes.

Figure 3:
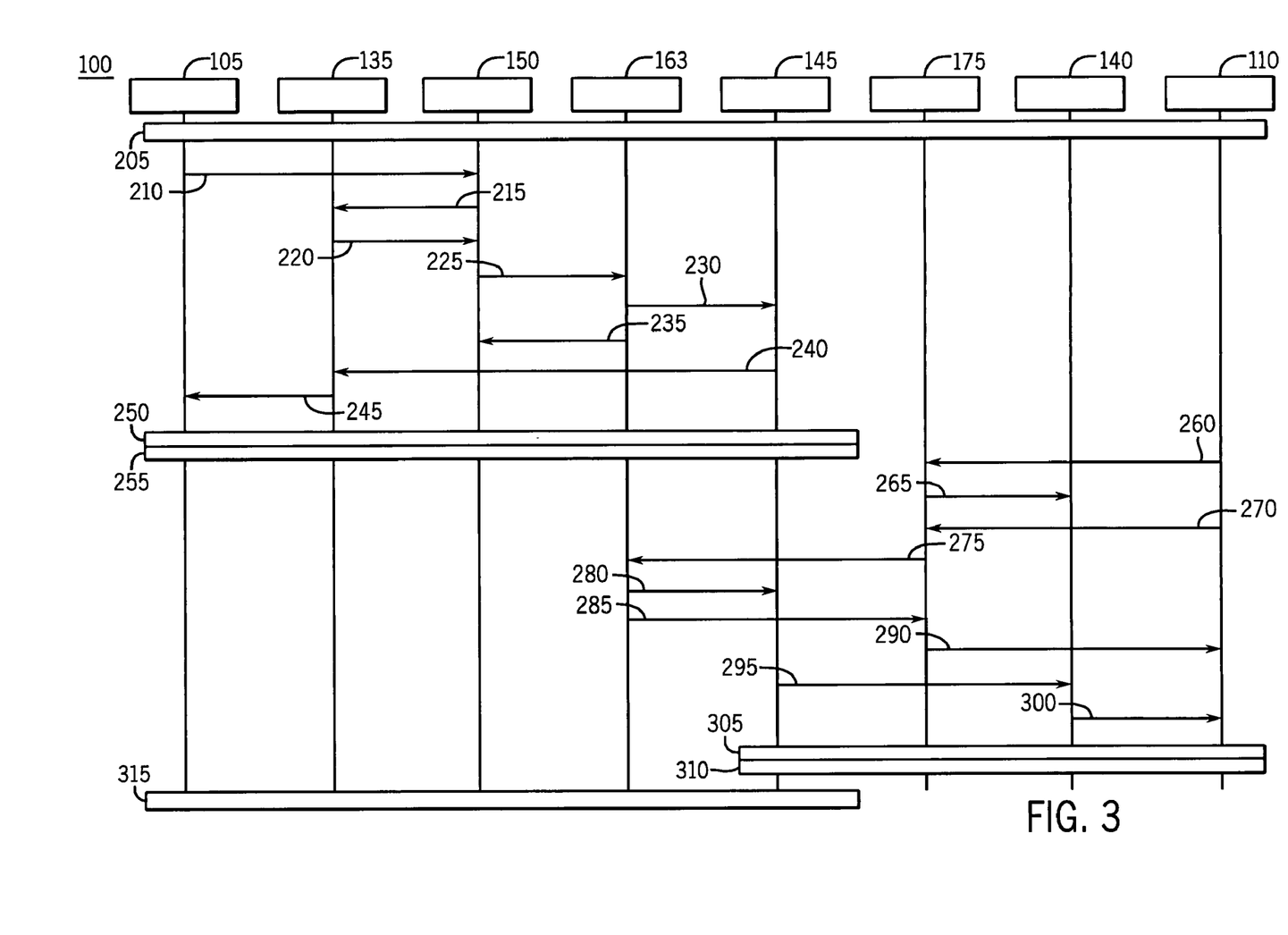
FIG. 3 is a representation of an exemplary process flow of a first establishment of a data stream associated with a conference call between a first application server component and a second application server component of the apparatus of FIG. 1.

Turning to FIGS. 1 and 3, a conference call is already in session, as in STEP 205. In STEP 210, the telephony device 105 communicates with the switch component 150 to join the conference call with the conference bridge component, the service component 163. In STEP 215, the switch component 150 communicates with the application server component 135 to obtain the identifier 505 associated with the call. In STEP 220, the application server component 135 associates the identifier 505 with the call and returns the identifier 505 to the switch component 150. In STEP 225, the switch component 150 initiates the message 502 (e.g., an Initial Address Message) to the conference bridge component 163.

In STEP 230, the service component 163 receives the message 502. The service component 163 communicates with the application server component 145. The service component 163 provides the identifier 505 from within the message 502 to the application server component 145. In STEP 235, the service component 163 sends an answer message to the switch component 150.

In STEP 240, the application server component 145 employs the identifier 505 from within the message 502 to initiate the data stream request message 702 to the application server component 135. The application server component 135 and 145 cooperate to establish the data stream 190. In STEP 245, the application server component 103 provides the web portal to the telephony device 113.

In STEP 250, the application server component 145 communicates with the telephony device 105 through employment of the application server component 135 and the web portal. In STEP 255, the application server components 135 and 145 serve to provide the one or more interfaces, for example, the control interface, to the telephony device 105.

In STEPS 260-310, the telephony device 110 joins the conference call with the telephony device 105. STEPS 260-310 are similar to STEPS 210-255. In STEP 315, the application server component 145 communicates with the application server component 135 to update the control interface provided to the telephony device 105. The application server component 135 updates the control interface to reflect the addition of the telephony device 110 to the conference call.

Figure 4:
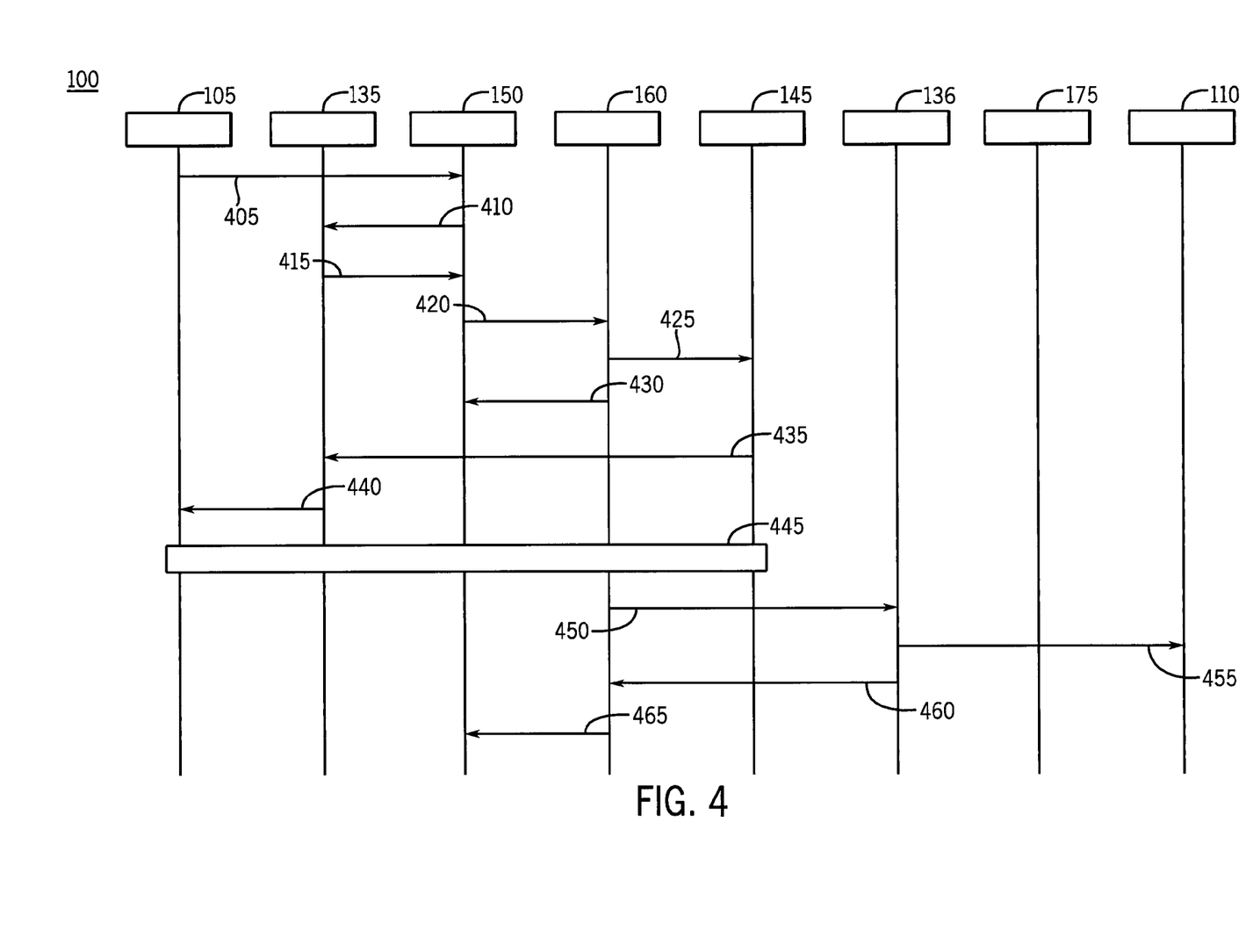
FIG. 4 is a representation of another exemplary process flow of an establishment of a data stream associated with a pre-paid call between a first application server component and a second application server component of the apparatus of FIG. 1.

Turning to FIGS. 2 and 4, the telephony device 105 initiates a pre-paid call to the telephony device 110. In STEP 405, the telephony device 105 communicates with the switch component 150 to establish the pre-paid call with the pre-paid service component, for example, the switch component 160. In STEP 410, the switch component 150 communicates with the application server component 135, to obtain the identifier 505 associated with the pre-paid call. In STEP 415, the application server component 135 associates the identifier 505 with the call and returns the identifier 505 to the switch component 150. In STEP 420, the switch component 150 initiates the initiation message 502 to the switch component 160. In STEP 425, the switch component 160 is pre-provisioned to communicate with the pre-paid service component 145. The application server component 145 receives the identifier 505 from within the initiation message 502 from the switch component 160.

In STEP 430, the switch component 160 initiates the answer message to the switch component 150. In STEP 435, the application server component 145 initiates the data stream request message 702 to the application server component 135 through employment of the identifier 505. The application server component 135 and the application server component 145 cooperate to establish the data stream 190.

In STEP 440, the application server component 135 establishes the one or more web portals with the telephony device 105. In STEP 445, the application server component 145 and the application server component 135 provide the one or more interfaces, for example, the call management interface, to the telephony device 105 through employment of the data stream 190 and the one or more web portals. A user of the telephony device 105 selects to initiate a call to the telephony device 110 from the call management interface.

In STEP 450, the application server component 145 and the switch component 160 cooperate to initiate the call to the telephony device 110. In STEP 455, the switch component 175 routes the call to the telephony device 110. In STEP 460, the switch component 175 initiates the address complete message to the switch component 160. In STEP 465, the switch component 160 communicates with the application server component 145 to indicate the delivery of the call. In STEP 470, the application server component 145 and the application server component 135 update the call management interface provided to telephony device 105. The application server 135 updates the call management interface to reflect the change of the status of the new call. In STEP 475, the application server component 135 provides the updated call management interfaces to the telephony device 105 through employment of the one or more web portals.

The apparatus 100 in one example comprises a plurality of components such as computer software and/or hardware components. A number of such components can be combined or divided in the apparatus 100. For example, the application server component 135 may be combined with the switch component 150. An exemplary component of the apparatus 100 employs and/or comprises a set and/or series of computer instructions written in or implemented with any of a number of programming languages, as will be appreciated by those skilled in the art.

The apparatus 100 employs at least one computer-readable medium. One example of a computer-readable medium for the apparatus 100 comprises an instance of a recordable data storage medium such as one or more of a magnetic, electrical, optical, biological, and atomic data storage medium. The recordable data storage medium in one example comprises the storage device 101. An exemplary component of the apparatus 100 employs and/or comprises a set and/or series of computer instructions written in or implemented with any of a number of programming languages, as will be appreciated by those skilled in the art.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. A network, comprising:
an intermediate application server component that provides one or more services to one or more telephony devices on a call through employment of one or more data streams associated with the call; and
an intermediate switch component, wherein the intermediate switch component and the one or more telephony devices cooperate to establish the call; and
wherein the intermediate switch component communicates with the intermediate application server component to establish the one or more data streams associated with the call; and
wherein the intermediate switch component maintains one or more voice portions of the call; and
wherein the intermediate application server component associates the one or more services with the call; and
wherein the intermediate application server component communicates with the intermediate switch component to update one or more of the one or more voice portions of the call based on the one or more services; and
wherein the call comprises a conference call, and wherein the intermediate switch component comprises a conference bridge component for said conference call, and wherein the one or more telephony devices comprise a first telephony device and a second telephony device, and wherein the conference bridge component prohibits an input from the first telephony device on the conference cell; and
wherein the intermediate application server component provides one or more control interfaces that allow the second telephony device to transmit a request to the intermediate application server component; and the intermediate application server component and the one or more user-related application server component employ the HyperText Transport Protocol (HTTP) to provide the one or more web portals to the one or more telephony devices; and
wherein in response to the request from the second telephony device to the intermediate application server component, the intermediate application server component and the conference bridge component update the conference call to allow the input from the first telephony device on the conference call.

2. A network, comprising:

an intermediate application server component that provides one or more services to one or more telephony devices on a call through employment of one or more data streams associated with the call; and an intermediate switch component, wherein the intermediate switch component and the one or more telephony devices cooperate to establish the call; and wherein the intermediate switch component communicates with the intermediate application server component to establish the one or more data streams associated with the call; and wherein the intermediate switch component maintains one or more voice portions of the call; and wherein the intermediate application server component associates the one or more services with the call; and wherein the intermediate application server component communicates with the intermediate switch component to update one or more of the one or more voice portions of the call based on the one or more services; and wherein the call comprises a pre-paid call, and wherein the intermediate switch component comprises a pre-paid service component, and wherein a telephony device of the one or more telephony devices establishes the pre-paid call with the pre-paid service component; and wherein the intermediate application server component provides one or more control interfaces that allow the telephony device to transmit a first request to the intermediate application server component, and wherein the first request initiates a first call; and wherein in response to the first request from the telephony device to the intermediate application server component, the intermediate application server component communicates with the pre-paid service component to initiate the first call, and wherein the intermediate application server component provides a first one or more of the one or more control interfaces to allow the telephony device to transmit a second request, and wherein the second request terminates the first call; and wherein in response to the second request from the telephony device to the intermediate application server component, the intermediate application server component communicates with the pre-paid service component to terminate the first call, and wherein the intermediate application server component provides a second one or more of the one or more control interfaces to allow the telephony device to transmit a third request, and wherein the third request initiates a second call; and wherein in response to the third request from the telephony device to the intermediate application server component, the intermediate application server component communicates with the pre-paid service component to initiate the second call.

3. The network of claim 1, wherein the intermediate application server component establishes the one or more data streams through employment of one or more identifiers, and at least one of the one or more identifiers is a port number.

4. The network of claim 1, wherein the intermediate application server component and one or more user-related application server components establish the one or more data streams; and wherein the intermediate application server component provides the one or more services to the one or more user-related application server components through employment of the one or more data streams.

5. The network of claim 4, wherein the one or more user-related application server components cooperate with the one or more telephony devices to establish one or more web portals that are employable by the intermediate application server component and the one or more user-related application server components to provide the one or more services to the one or more telephony devices.

6. The network of claim 5, wherein the intermediate application server component and the one or more user-related application server components provide one or more interfaces associated with the one or more services to the one or more telephony devices through employment of the one or more web portals for employment by the one or more telephony devices in interaction with the one or more services.

7. The network of claim 6, wherein the intermediate application server component cooperates with the one or more telephony devices to establish the call; and wherein the intermediate application server component alters the call based on the interaction with the one or more services.

8. The network of claim 6, wherein the intermediate application server component alters one or more of the one or more interfaces based on the employment of the one or more services; and wherein the intermediate application server component and the one or more user-related application server components cooperate to update the one or more of the one or more interfaces through employment of the one or more data streams.

9. The network of claim 8, wherein the one or more telephony devices comprise a first telephony device and a second telephony device, and wherein the intermediate application server component and the one or more user-related application server components cooperate to provide a first one or more interfaces to the first telephony device and a second one or more interfaces to the second telephony device; and wherein the intermediate application server component allows the first telephony device to interact with one or more of the one or more services through employment of the first one or more interfaces; and wherein the intermediate application server component automatically updates one or more of the second one or more interfaces based on the first telephony device based on the one or more of the one or more services.

10. The network of claim 9, wherein the one or more of the first one or more interfaces comprise a first one or more of the first one or mare interfaces, and wherein the intermediate application server component and the one or more user-related application server components update a second one or more the first one or more interfaces based on the one or more of the one or more services.

11. The network of claim 6, wherein the one or more interfaces comprise one or more graphical user interfaces; and wherein the intermediate application server component and the one or more user-related application server components provide the one or more graphical user interfaces that are employable by the one or more telephony devices.

12. The network of claim 11, wherein the intermediate application server component employ the eXtended Markup Language (XML) to provide the one or more graphical user interfaces.

13. The network of claim 2, wherein the intermediate application server component and one or more user-related application server components establish the one or more data streams; and wherein the intermediate application server component provides the one or more services to the one or more user-related application server components through employment of the one or more data streams.

14. The network of claim 13, wherein the one or more user-related application server components cooperate with the one or more telephony devices to establish one or more web portals that are employable by the intermediate application server component and the one or more user-related application server components to provide the one or more services to the one or more telephony devices.

15. The network of claim 14, wherein the intermediate application server component and the one or more user-related application server components provide one or more interfaces associated with the one or more services to the one or more telephony devices through employment of the one or more web portals for employment by the one or more telephony devices in interaction with the one or more services.

16. The network of claim 15, wherein the intermediate application server component cooperates with the one or more telephony devices to establish the call; and wherein the intermediate application server component alters the call based on the interaction with the one or more services.

17. The network of claim 15, wherein the intermediate application server component alters one or more of the one or more interfaces based on the employment of the one or more services; and wherein the intermediate application server component and the one or more user-related application server components cooperate to update the one or more of the one or more interfaces through employment of the one or more data streams.

18. The network of claim 17, wherein the one or more telephony devices comprise a first telephony device and a second telephony device, and wherein the intermediate application server component and the one or more user-related application server components cooperate to provide a first one or more interfaces to the first telephony device and a second one or more interfaces to the second telephony device; and wherein the intermediate application server component allows the first telephony device to interact with one or more of the one or more services through employment of the first one or more interfaces; and wherein the intermediate application server component automatically updates one or more of the second one or more interfaces based on the first telephony device based on the one or more of the one or more services.

19. The network of claim 18, wherein the one or more of the first one or more interfaces comprise a first one or more of the first one or more interfaces, and wherein the intermediate application server component and the one or more user-related application server components update a second one or more the first one or more interfaces based on the one or more of the one or more services.

20. The network of claim 15, wherein the one or more interfaces comprise one or more graphical user interfaces; and wherein the intermediate application server component and the one or more user-related application server components provide the one or more graphical user interfaces that are employable by the one or more telephony devices.

21. The network of claim 20, wherein the intermediate application server component employ the eXtended Markup Language (XML) to provide the one or more graphical user interfaces.

22. The network of claim 14, wherein the intermediate application server component and the one or more user-related application server component employ the HyperText Transport Protocol (HTTP) to provide the one or more web portals to the one or more telephony devices.

* * * * *